L. J. WESTBROOK.
PLOW.
APPLICATION FILED JULY 23, 1920.

1,401,020.

Patented Dec. 20, 1921.
2 SHEETS—SHEET 1.

L.J.Westbrook INVENTOR

BY *Victor J. Evans*

ATTORNEY

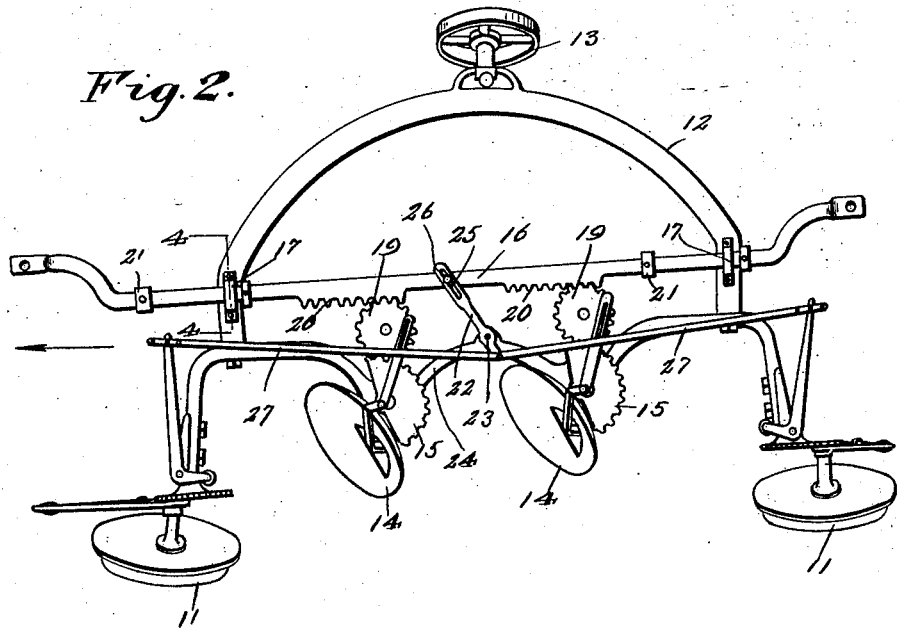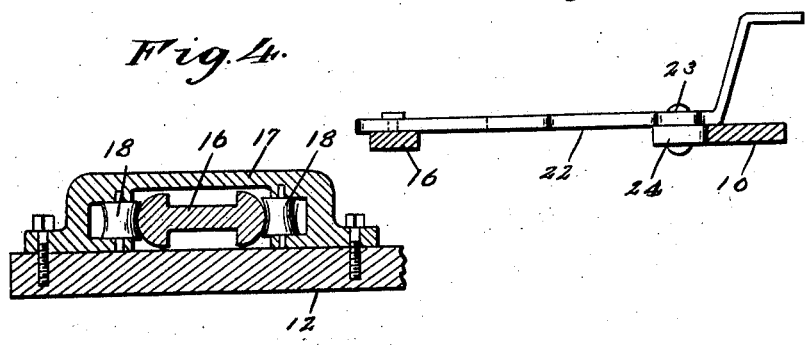

UNITED STATES PATENT OFFICE.

LUTHER J. WESTBROOK, OF FLOWERY BRANCH, GEORGIA.

PLOW.

1,401,020. Specification of Letters Patent. Patented Dec. 20, 1921.

Application filed July 23, 1920. Serial No. 398,371.

*To all whom it may concern:*

Be it known that I, LUTHER J. WESTBROOK, a citizen of the United States, residing at Flowery Branch, in the county of Hall and State of Georgia, have invented new and useful Improvements in Plows, of which the following is a specification.

This invention relates to reversible disk plows, and has for its chief characteristic the provision of means whereby the disks and furrow wheels are shifted or reversed to properly position the same with respect to the ground when the plow is moved in a direction opposite to that in which it was traveling.

The nature and advantages of the invention will be better understood when the following detailed description is read in connection with the accompanying drawings, the invention residing in the construction, combination and arrangement of parts as claimed.

In the drawings forming part of this application like numerals of reference indicate similar parts in the several views and wherein:

Fig. 2 is a similar view showing the position of parts when the machine is moving in a direction indicated by the arrow.

Fig. 4 is a similar view taken on line 4—4 of Fig. 2.

Fig. 5 is a similar view taken on line 5—5 of Fig. 1.

Figure 1:
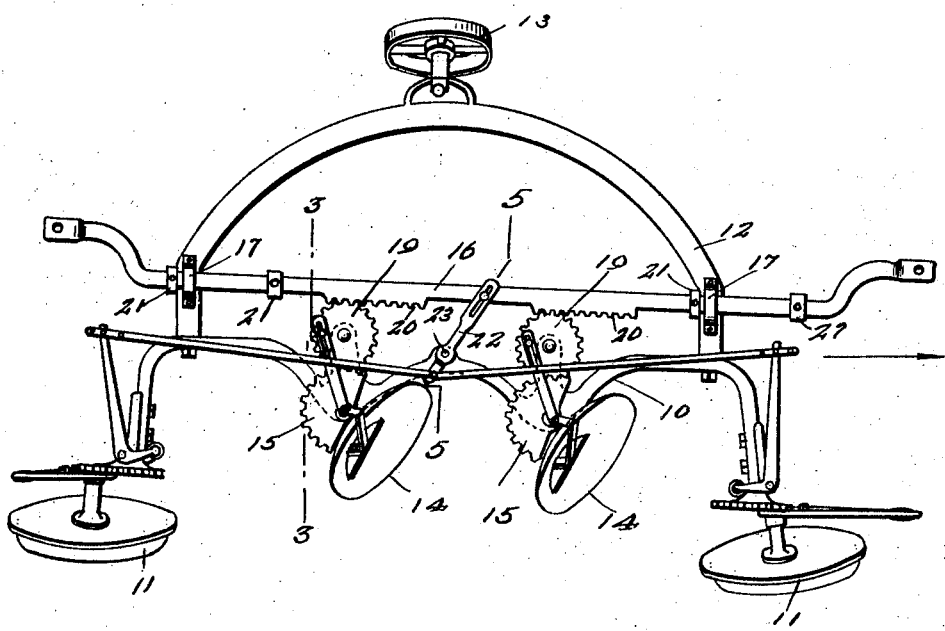
Figure 1 is a top plan view showing the position of the wheels and disks when the machine is moving in a direction indicated by the arrow.
Figure 3:
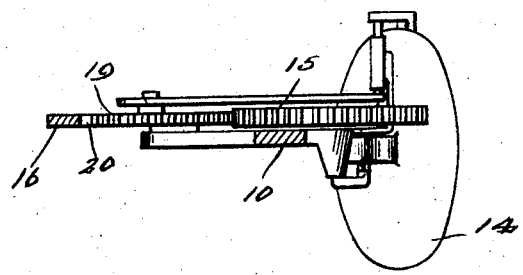
Fig. 3 is an enlarged sectional view taken on line 3—3 of Fig. 1.

Referring to the drawings in detail, 10 indicates the main frame of the plow, upon which are journaled the furrow wheels 11, and with which the land wheel frame 12 is connected, the land wheel being indicated at 13. The disks are indicated at 14 and are equipped with the usual disk segments 15 for the purpose to be hereinafter described. The plow may be drawn over the ground surface by any suitable means, preferably by means of a light tractor (not shown), the tractor being adapted to be coupled to either end of the tongue or beam 16 which projects an appreciable distance beyond the opposite ends of the plow. The tongue or beam is mounted for sliding movement upon the land wheel frame, and operates through suitable brackets 17 secured to the frame at the opposite ends thereof, these brackets supporting for rotation all the rollers 18 which minimizes friction between the parts. Journaled for rotation immediately above each disk is a gear 19 which measures with the toothed segment for said disks, and also with a rack bar 20 secured to the tongue or beam 16. The tongue or beam 16 as above stated is mounted for sliding movement through the brackets, but is limited in its movements in opposite direction by means of collars or stops 21 secured to the tongue or beam 16 at spaced points, these stops being disposed to engage the frame at 12.

A lever 22 is pivoted at a point between its ends as at 23 to a stationary member 24, the lever having an elongated slot 25 which receives a pin 26 projecting from the tongue or beam 16. Consequently, the lever 22 is moved upon its pivot through the instrumentality of the tongue or beam 16. Connected to the opposite end of the lever are rods 27 projecting in opposite directions and connecting the levers of the furrow wheels, so that these wheels may be automatically operated in the well known manner simultaneously with the shifting or reversing of the disk 14.

In practice, when the plow is being drawn in the direction of the arrow indicated in Fig. 1, one of the stops 21 of the tongue or beam bears against the adjacent ends of the frame 12, and the disks 14 held in proper position with respect to the ground when the plow is moving in the direction indicated. When it is desired to plow in an opposite direction, it is necessary of course to change the position of the disks 14 and the spur wheels 11. The tractor is then uncoupled from one end of the beam or tongue 16 and brought around to be coupled with the opposite end of said tongue or beam. When a pull is exerted upon the beam in the direction indicated by the arrow in Fig. 2, the tongue or beam slides through the brackets 17 and guided by the rollers 18, until the other of the stops 21 is brought into engagement with the adjacent end of the frame as shown in Fig. 2. By this movement of the beam, rotation is imparted to the gears 19 by means of the rack bars 20, and as the wheels 19 rotate they automatically shift or reverse the disks 14 in the position shown in Fig. 2, incident to the fact that the gears are meshed with the segments 15. Simultaneously with the shifting of the disks, the lever 22 is actuated in the manner described to shift the furrow wheels 11.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim is:

In a reversible disk plow, a frame, a pair of brackets secured to said frame adjacent to the opposite ends thereof, spaced rollers rotatably mounted in said brackets, a draft tongue extending through said brackets and engaging said rollers, a plurality of spaced collars secured to said tongue and adapted to engage said frame, a lever pivotally secured to said frame and provided with an elongated slot, a pin projecting from said tongue and engaging said slot, a plurality of disks pivotally secured to said frame, spaced rack bars carried by said tongue, toothed segments pivotally secured to said frame, and adapted to actuate said disks, gears meshing with said segments and said bars, a plurality of furrow wheels pivotally secured to said frame and means engaging said lever for shifting said furrow wheels simultaneously with the actuation of said disks.

In testimony whereof I affix my signature.

LUTHER J. WESTBROOK.